United States Patent
Wu et al.

(10) Patent No.: US 10,797,554 B2
(45) Date of Patent: Oct. 6, 2020

(54) ACTUATOR AND ELECTRONIC CLUTCH SYSTEM

(71) Applicant: Johnson Electric S.A., Murten (CH)

(72) Inventors: Kai Wu, Shenzhen (CN); Jian Dong, Shenzhen (CN); Jun Fu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 301 days.

(21) Appl. No.: 15/917,373

(22) Filed: Mar. 9, 2018

(65) Prior Publication Data
US 2018/0278115 A1    Sep. 27, 2018

(30) Foreign Application Priority Data
Mar. 27, 2017  (CN) .......................... 2017 1 0189074

(51) Int. Cl.
| | | |
|---|---|---|
| *H02K 29/08* | (2006.01) | |
| *H02K 5/10* | (2006.01) | |
| *H02K 7/108* | (2006.01) | |
| *H02K 11/215* | (2016.01) | |
| *H02K 11/30* | (2016.01) | |
| *F16D 48/06* | (2006.01) | |
| *H02K 11/33* | (2016.01) | |
| *H02K 5/18* | (2006.01) | |
| *G01D 5/16* | (2006.01) | |
| *G01D 5/14* | (2006.01) | |
| *H02K 5/22* | (2006.01) | |

(52) U.S. Cl.
CPC .............. *H02K 5/10* (2013.01); *F16D 48/06* (2013.01); *H02K 5/18* (2013.01); *H02K 7/108* (2013.01); *H02K 11/215* (2016.01); *H02K 11/30* (2016.01); *H02K 11/33* (2016.01); *F16D 2500/102* (2013.01); *F16D 2500/1107* (2013.01); *F16D 2500/302* (2013.01); *G01D 5/145* (2013.01); *G01D 5/16* (2013.01); *H02K 5/225* (2013.01); *H02K 2211/03* (2013.01)

(58) Field of Classification Search
CPC ....... H02K 29/08; H02K 11/33; H02K 11/215
See application file for complete search history.

(56) References Cited

U.S. PATENT DOCUMENTS

| | | | | |
|---|---|---|---|---|
| 4,988,905 | A * | 1/1991 | Tolmie, Jr. ............. | H02K 29/06 310/68 B |
| 5,969,445 | A * | 10/1999 | Horiuchi ................ | H02K 11/40 310/64 |
| 6,424,061 | B1 * | 7/2002 | Fukuda .................. | H02K 29/08 310/49.11 |
| 7,109,615 | B2 * | 9/2006 | Doemen ................. | F16C 25/08 310/68 B |
| 9,979,268 | B2 * | 5/2018 | Sadanaga ............... | H02K 29/08 |
| 2014/0246958 | A1 * | 9/2014 | Taniguchi ............. | H02K 21/14 310/68 B |

* cited by examiner

*Primary Examiner* — Dang D Le
(74) *Attorney, Agent, or Firm* — Millman IP Inc.

(57) ABSTRACT

An actuator includes a controller, a motor and a sensor device. The controller includes a housing, and the motor includes a rotor, and the rotor includes a rotating shaft. The motor is mounted on the outside of the housing, and the sensor device includes a magnet and a sensor, the magnet is mounted on the rotating shaft of the motor, and the sensor is mounted inside the housing. The actuator has a good waterproof performance and anti-interference ability. This disclosure also relates to an electronic clutch system having the actuator.

12 Claims, 7 Drawing Sheets

FIG. 7

ACTUATOR AND ELECTRONIC CLUTCH SYSTEM

CROSS REFERENCE TO RELATED APPLICATIONS

This non-provisional patent application claims priority under 35 U.S.C. § 119(a) from Patent Application No. 201710189074.8 filed in The People's Republic of China on Mar. 27, 2017, the entire contents of which are hereby incorporated by reference.

FIELD OF THE DISCLOSURE

The present disclosure relates to the field of electric machine, and in particular, to an actuator driven by a motor and an electronic clutch system having the actuator.

BACKGROUND OF THE DISCLOSURE

Electronic clutch system typically includes a magnetoresistive sensor disposed on an actuator, the magnetoresistive sensor typically includes a position-fixed sensor and a position-changeable magnet, and an air gap is formed between the sensor and the magnet. By installing the magnet in a rotating apparatus, such as a rotating shaft, the magnet changes its magnetic field between the sensor and the magnet during rotating with the rotating shaft, which results in a change in the current of the sensor, and then the position of the rotating shaft is calculated.

At present, the sensor of the magnetoresistive sensor is very close to the magnet, and once the water enters the sensor, it can cause the sensor to malfunction.

SUMMARY OF THE DISCLOSURE

Hence, there is a desire for a waterproof actuator.

Accordingly, in one aspect thereof, the present disclosure provides an actuator. The actuator includes a controller including a housing; a motor including a rotor, and the rotor includes a rotating shaft; and a sensor device; in which the motor is mounted on the outside of the housing, and the sensor device includes a magnet and a sensor, the magnet is mounted on the rotating shaft of the motor, and the sensor is mounted inside the housing.

Preferably, a receiving cavity is formed in the housing, the sensor is disposed in the receiving cavity.

Preferably, a groove is disposed on one side of the housing, and the motor is partially recessed in the groove of the housing.

Preferably, a groove is disposed on one side of the housing, one end of the rotating shaft is received in the groove, and the magnet is mounted on the end of the rotating shaft.

Preferably, the sensor device further includes a mounting member secured to the end of the rotating shaft, and the magnet is mounted in the mounting member, facing a bottom wall of the groove.

Preferably, a mounting groove is defined in a side of the bottom wall of the groove facing away from the rotating shaft, and the sensor is received in the mounting groove.

Preferably, the mounting groove, the groove, the magnet, and the rotating shaft are disposed opposite to each other in the axial direction of the rotating shaft.

Preferably, the housing includes an upper cover and a lower cover, the upper cover and the lower cover are assembled to form a receiving cavity, the controller further includes a circuit board received in the receiving cavity and a plurality of electronic components mounted on the circuit board, the motor is mounted on one side of the upper cover.

Preferably, the mounting member includes a latching portion for latching on the rotating shaft and a receiving portion for receiving the magnet, one end of the latching portion is provided with a clamping groove, and one end of the rotating shaft is retained in the clamping groove.

In second aspect, the present disclosure provides an electronic clutch system. The electronic clutch system includes an actuator; in which an actuator includes a controller including a housing; a motor including a rotor, and the rotor includes a rotating shaft; and a sensor device; in which the motor is mounted on the outside of the housing, and the sensor device includes a magnet and a sensor, the magnet is mounted on the rotating shaft of the motor, and the sensor is mounted inside the housing.

In view of the foregoing, in present disclosure, the controller of the actuator includes a housing. A magnet of the sensor device is mounted on an end of the rotating shaft. The sensor is mounted in the housing to prevent other substances, such as water, from entering the sensor, causing the sensor to fail. In addition, the upper cover of the housing defines a mounting groove for receiving the sensor at a position opposite to the magnet, so that a thickness of the bottom wall of the housing between the magnet and the sensor is smaller, thus reducing obstruction.

BRIEF DESCRIPTION OF THE DRAWINGS

A preferred embodiment of the disclosure will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Various features are described hereinafter with reference to the figures. It shall be noted that the figures are not drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. It should be noted that, when a component is referred to as being "fixed to" another component, it can be on another component or exist inside another component. When a component is referred to be "connected" to another component, it can be connected to another component or exist inside another component. When a component is referred to be "set to" another component, it can be disposed on another component or exist inside another component.

Figure 1:
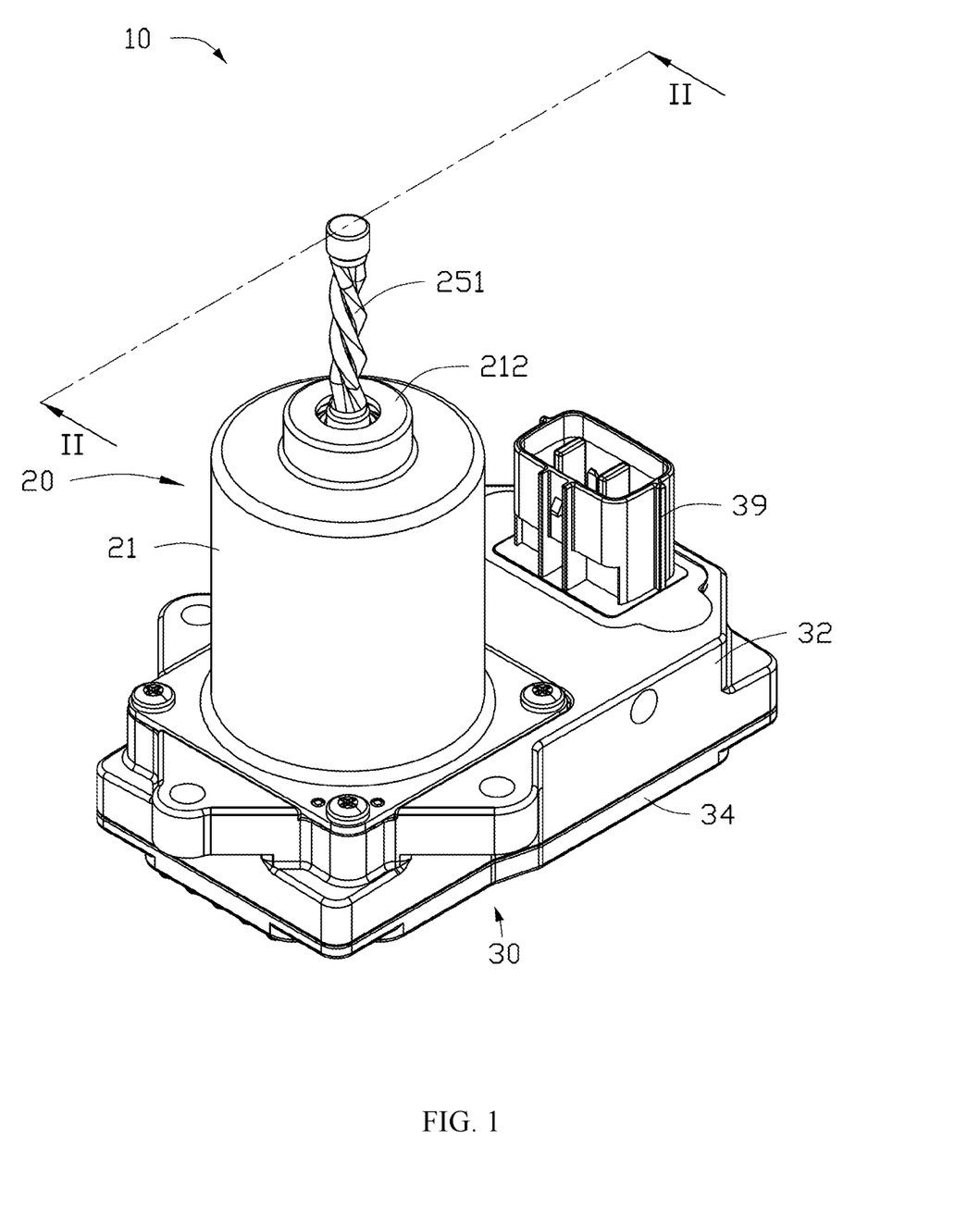
FIG. 1 illustrates an actuator according to one embodiment of the present disclosure.
Figure 2:
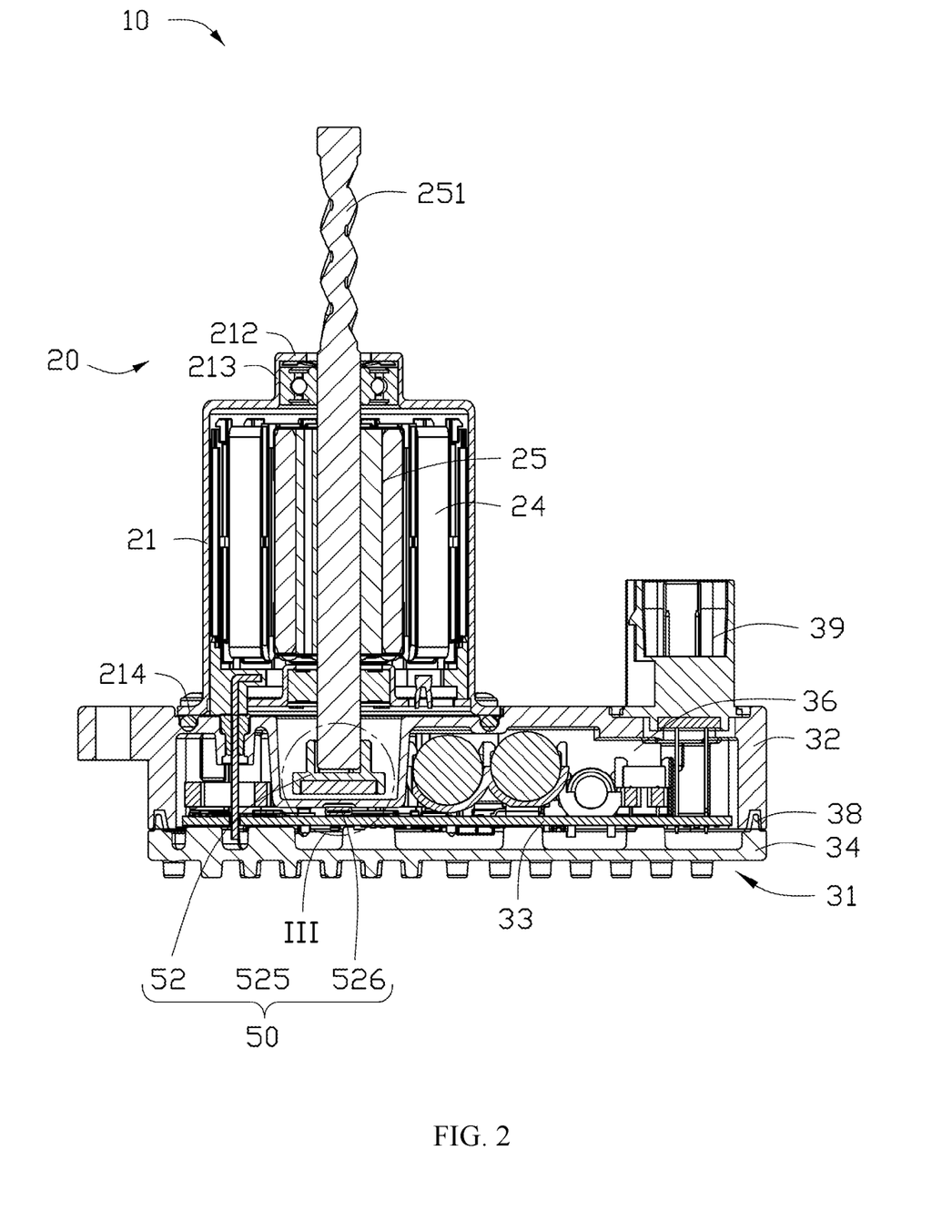
FIG. 2 is a sectional view of the actuator of FIG. 1, taken along the cutting line II-II.

Referring to FIG. 1 and FIG. 2, an electronic clutch system according to an embodiment of the present disclosure is applied in an automobile to cut off transmitting between an engine and a transmission, so that the automobile can realize gear shift. The electronic clutch system includes an actuator 10, and the actuator 10 includes a controller 30 and a sensor device 50. The controller 30 is an ECU (Electronic Control Unit) system of a car, and is configured to control the actuator 10 to perform a clutch operation. The actuator 10 is used to disconnect the engine from the transmission.

The actuator 10 further includes a motor 20, and the motor 20 includes a shell 21, a stator 24 and a rotor 25 mounted in the shell 21. The controller 30 includes a housing 31. The shell 21 is connected to the outside of the housing 31, and the motor 20 is partially recessed in the housing 31. A bearing seat 212 for receiving a bearing 213 is disposed on a side of the shell 21 away from the controller 30, and the bearing 213 is used to support a rotating shaft 251 of the rotor 25. In the embodiment of the present disclosure, the shell 21 has a main portion, and the main portion of the shell 21 is a hollow cylinder.

The controller 30 further includes a circuit board 33 mounted in the housing 31. The circuit board 33 has a plurality of electronic components 35 mounted thereon. The controller 30 is configured to supply power to the motor 20 and the sensor device 50. In the embodiment of the present disclosure, the housing 31 of the controller 30 is used for supporting and connecting to the motor 20.

Figure 3:
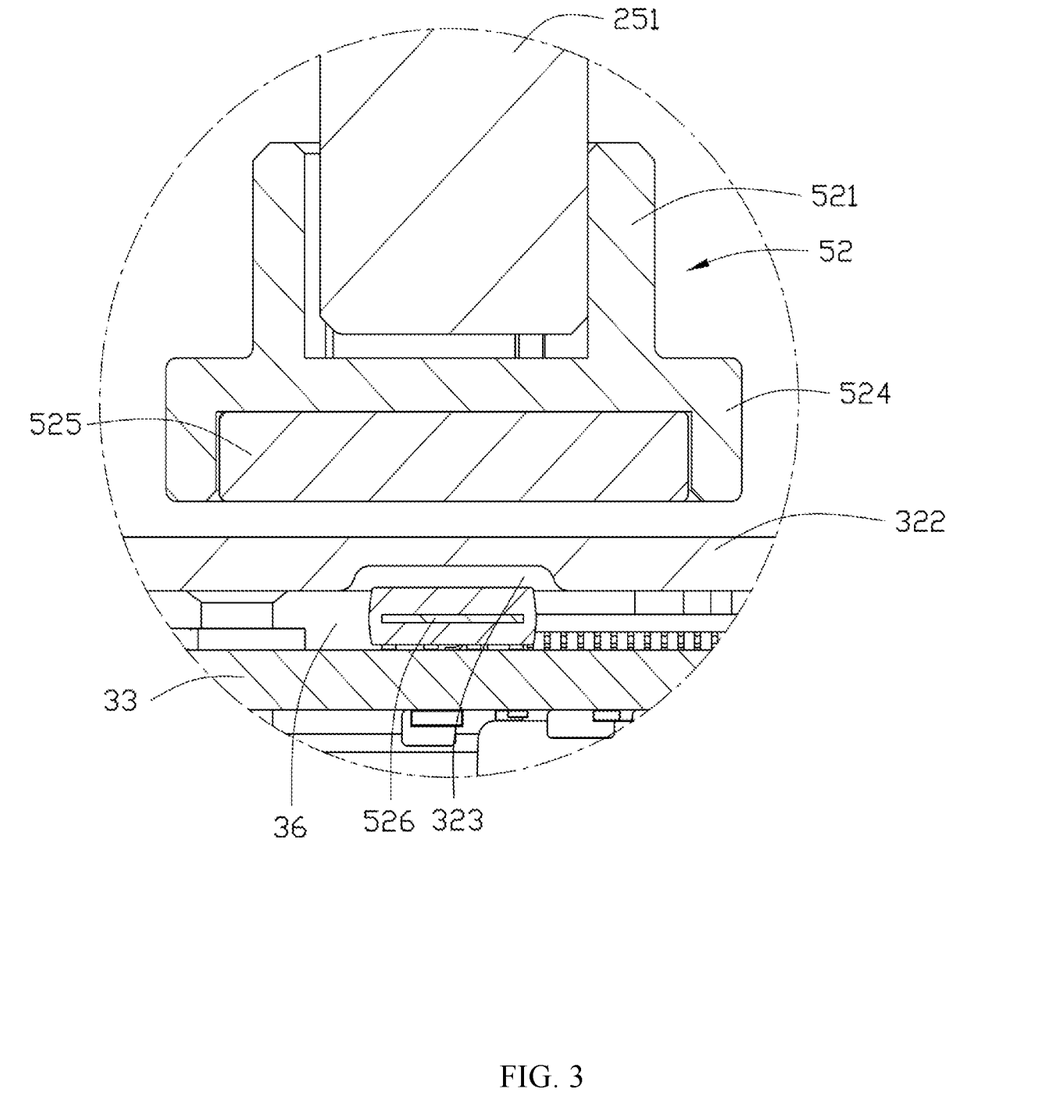
FIG. 3 is a partial enlarged view of the portion III of the actuator of FIG. 2.
Figure 4:
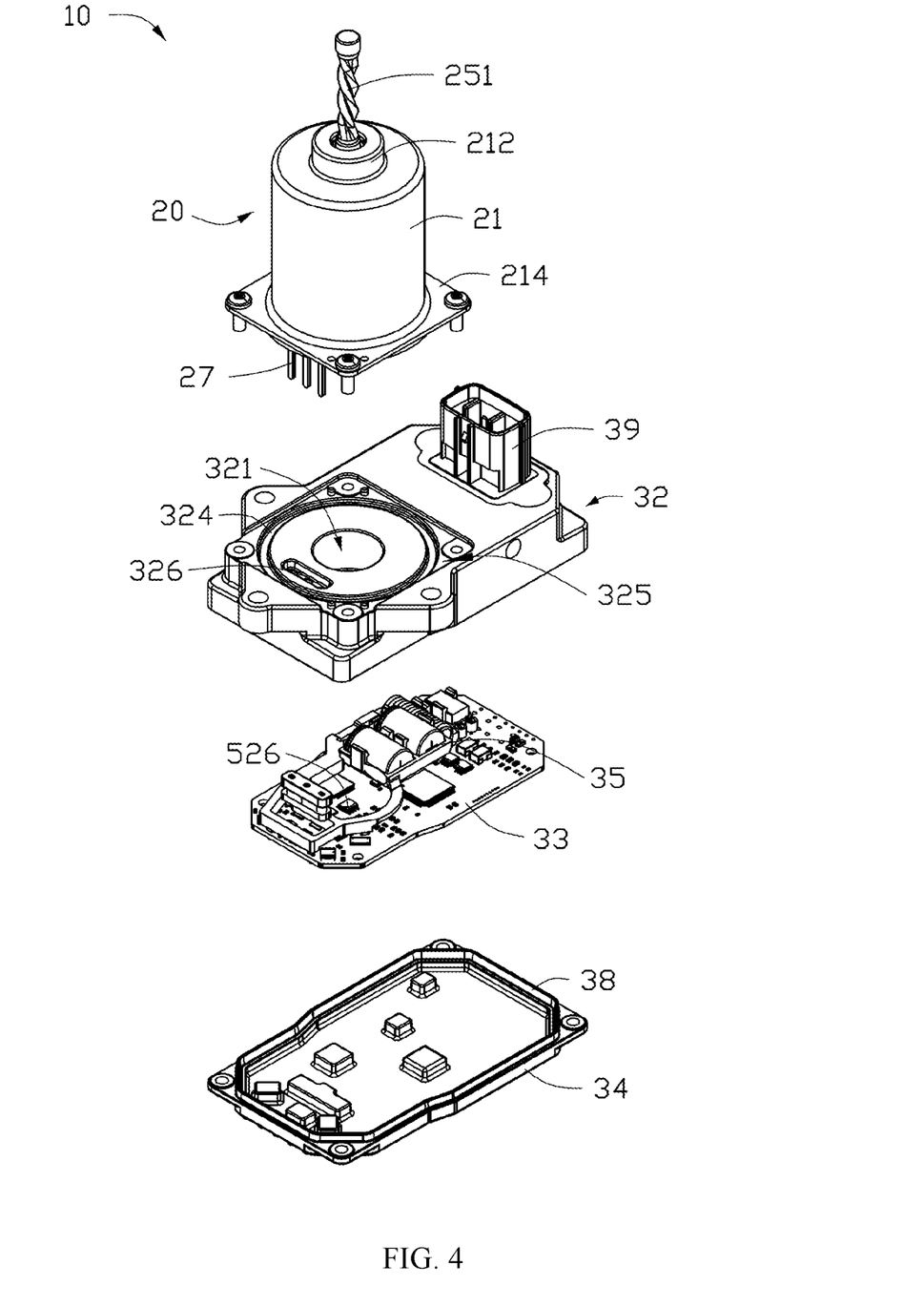
FIG. 4 is a partially exploded view of the actuator of FIG. 1.
Figure 5:
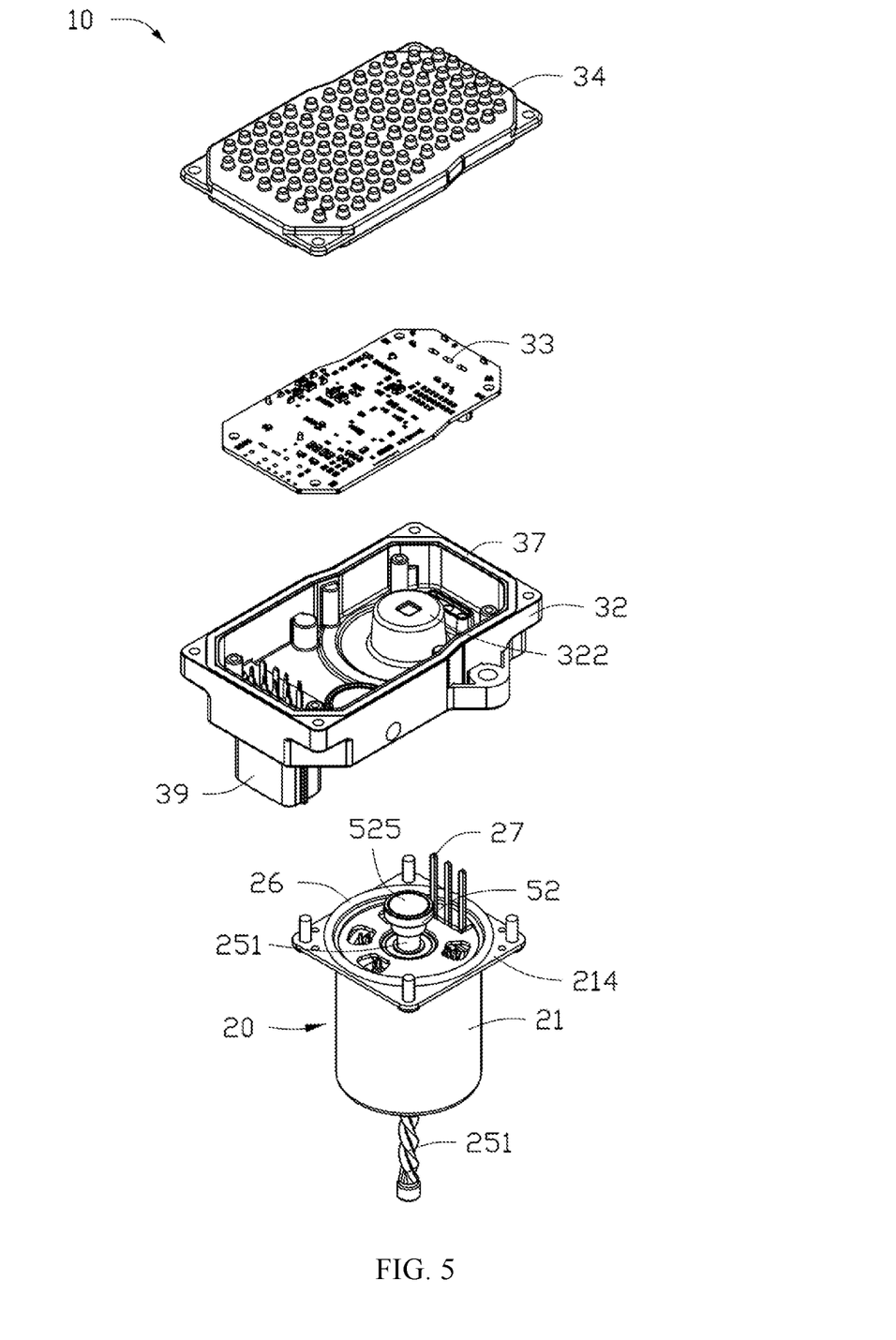
FIG. 5 is a partially exploded view of the actuator of FIG. 1, viewed from another angle.

Referring to FIG. 2 through FIG. 4, the housing 31 includes an upper cover 32 and a lower cover 34, and the upper cover 32 and the lower cover 34 are assembled to form a hollow body including a receiving cavity 36, and the circuit board 33 and a plurality of electronic components 35 are received in the receiving cavity 36. A sealing ring 37 (as shown in FIG. 5) is disposed at a portion where the upper cover 32 and the lower cover 34 are connected, and the sealing ring 37 is used for sealing the receiving cavity 36 of the housing 31. In order to make the sealing effect of the sealing ring 37 better, a sealing groove (not labeled) is provided on a side of the upper cover 32 adjacent to the lower cover 34, and the sealing groove is used to accommodate the sealing ring 37. In the embodiment, the sealing groove is annular. In addition, an abutting portion 38 is provided on one side of the lower cover 34 adjacent to the upper cover 32. The abutting portion 38 is received in the sealing groove and abuts against the sealing ring 37. In other embodiments, it can be understood that the seal groove may also be disposed on the lower cover 34, and the abutting portion 38 is disposed on the upper cover 32.

A groove 321 is disposed on a side of the upper cover 32 adjacent to the rotating shaft 251, and one end of the rotating shaft 251 is rotatably received in the groove 321. The sensor device 50 includes a magnet 525 and a sensor 526. The magnet 525 is mounted on the end of the rotating shaft 251.

The sensor 526 is disposed in the receiving cavity 36 and is mounted on the circuit board 33. The sensor 526 is opposite to the magnet 525, so that the sensor 526 can sense the position information of the magnet 525. Preferably, the sensor device 50 is a magnetoresistive sensor.

With referring to FIG. 4 and FIG. 5, the groove 321 includes a bottom wall 322. A mounting groove 323 is defined in a side of the bottom wall 322 adjacent to the receiving cavity 36. The sensor 526 is received in the mounting groove 323, such that the distance between the magnet 525 and the sensor 526 is smaller. In addition, a thickness of a portion of the bottom wall 322 where the mounting groove 323 is formed is smaller, so that the signal transmission interference between the magnet 525 and the sensor 526 is smaller. The mounting groove 323, the groove 321, the magnet 525, and the rotating shaft 251 are disposed opposite to each other in the axial direction of the rotating shaft 251.

Referring to FIG. 4, a mating portion 325 is disposed on a side of the upper cover 32 where the groove 321 is disposed. The housing 21 further includes a connecting portion 214. The connecting portion 214 is mounted in the mating portion 325. In the embodiment of the present disclosure, the mating portion 325 is formed by partially retracting a portion of the upper cover 32 inwardly. A sealing groove 324 is also formed on the mating portion 325, and a sealing ring 26 is received in the sealing groove 324 (as shown in FIG. 5). When the mating portion 325 is connected to the connecting portion 214, the sealing ring 26 seals the connecting portion between the connecting portion 214 and the mating portion 325.

The upper cover 32 is further provided with a through hole 326, and the through hole 326 is disposed between the groove 321 and the sealing groove 324. Conductive terminals 27 of the motor 20 are electrically connected to the circuit board 33 through the through hole 326.

Figure 6:
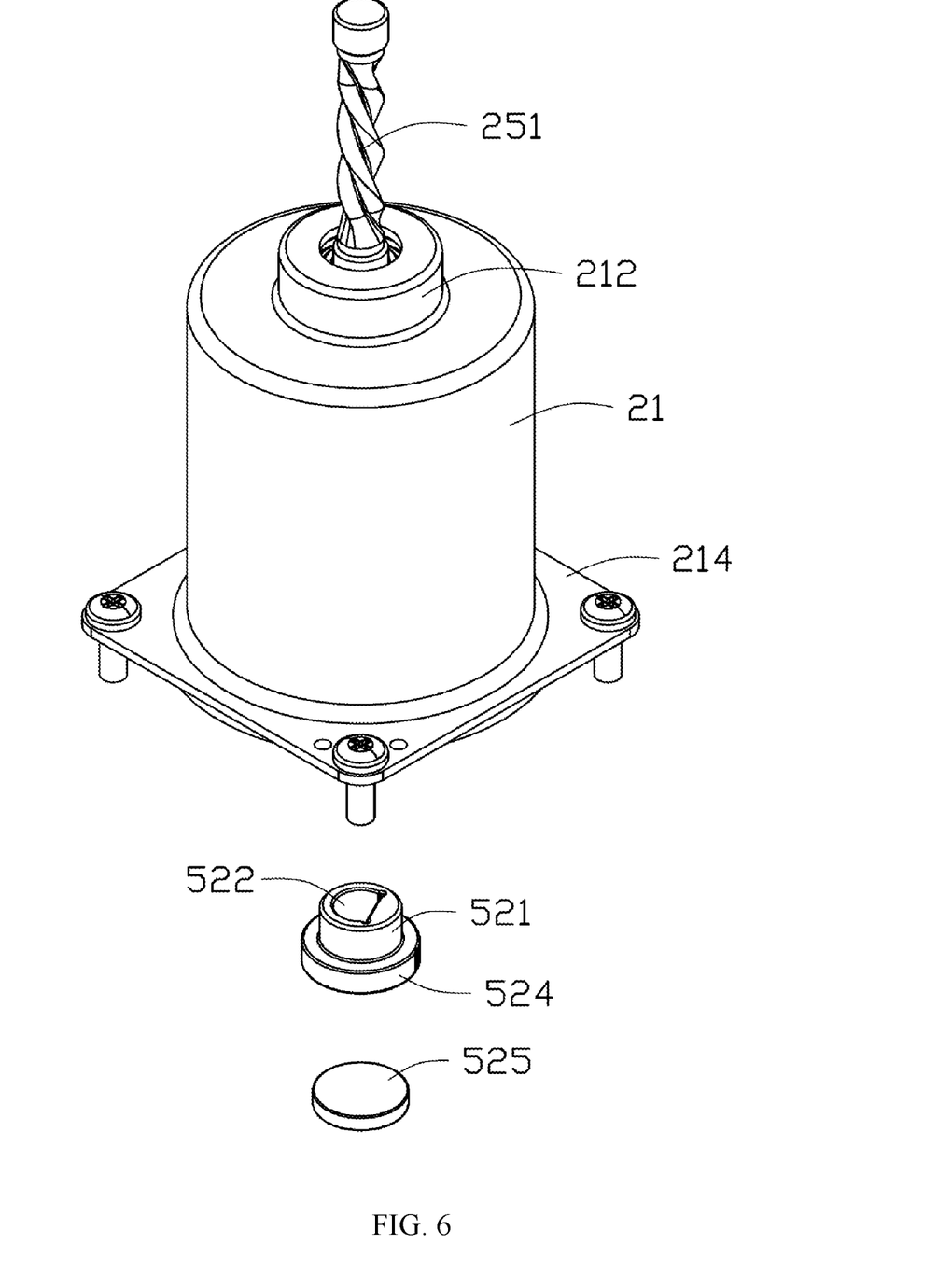
FIG. 6 is a partially exploded view of a motor and a sensor device of the actuator of FIG. 1.
Figure 7:
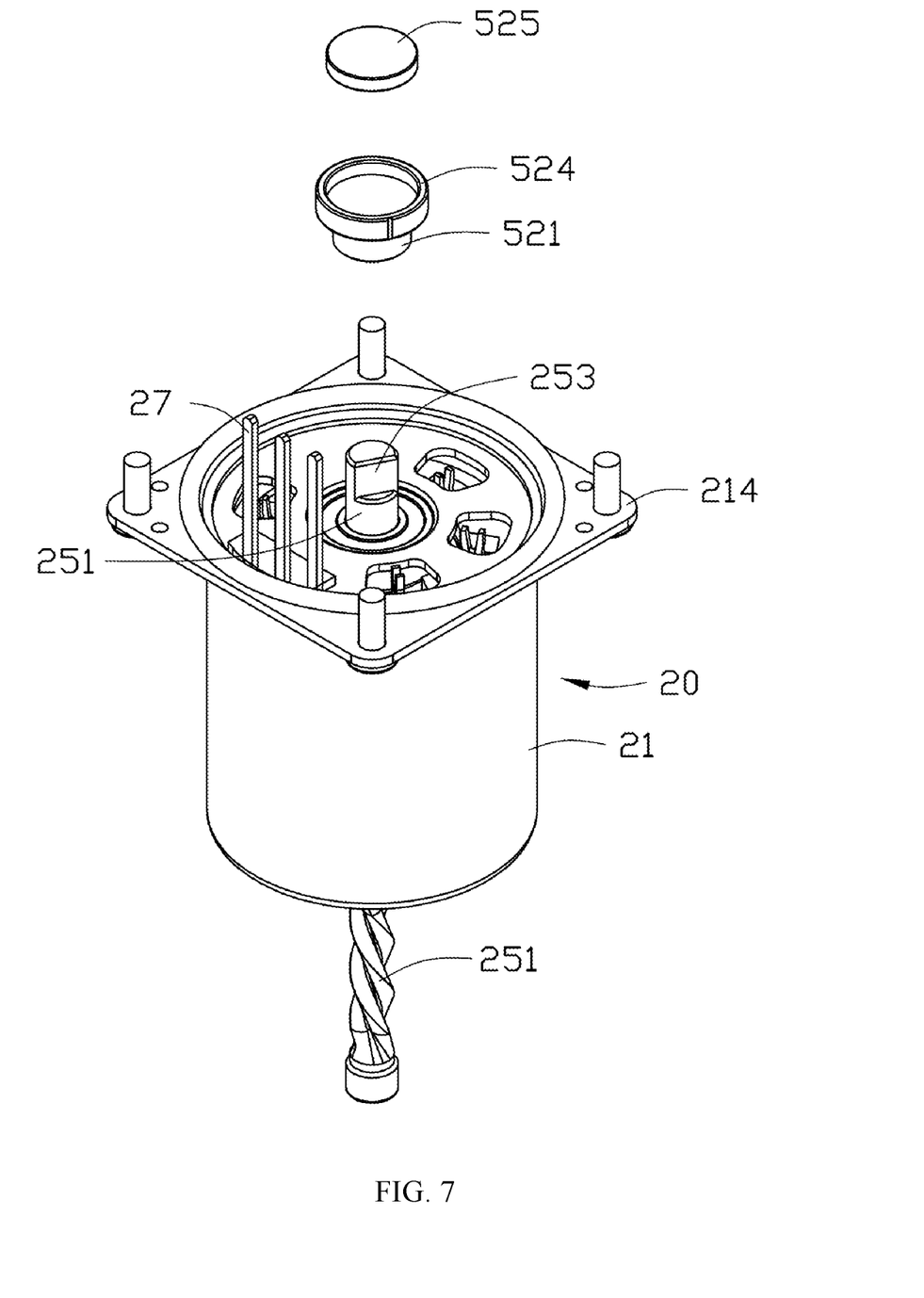
FIG. 7 is a partially exploded view of a motor and a sensor device of the actuator of FIG. 1, viewed from another angle.

Referring to FIG. 6 and FIG. 7, the sensor device 50 further includes a mounting member 52 for mounting the magnet 525. One end of the mounting member 52 is latched to the rotating shaft 251 and rotates with the rotating shaft 251, and the other end of the mounting member 52 is used for mounting the magnet 525. In the embodiment of the present disclosure, the mounting member 52 includes a latching portion 521 for latching on the rotating shaft 251 and a receiving portion 524 for receiving the magnet 525. One end of the latching portion 521 is provided with a clamping groove 522, and one end of the rotating shaft 251 is retained in the clamping groove 522. Specifically, one end of the rotating shaft 251 is provided with a notch 253. The cross-sectional shape of the clamping groove 522 is the same as the cross-sectional shape of one end of the rotating shaft 251 where the notch 253 is formed, so that the mounting member 52 rotates with the rotating shaft 251.

In present disclosure, the controller 30 of the actuator 10 includes a housing 31. A magnet 525 of the sensor device 50 is mounted on an end of the rotating shaft 251. The sensor 526 is mounted in the housing 31 to prevent other substances, such as water, from entering the sensor 526, causing the sensor 526 to fail. In addition, the upper cover 32 of the housing 31 defines a mounting groove 323 for receiving the sensor 526 at a position opposite to the magnet 525, so that a thickness of the bottom wall 322 of the housing 31 between the magnet 525 and the sensor 526 is smaller, thus reducing obstruction.

In the description and claims of the present application, each of the verbs "comprise", "include" and "have", and variations thereof, are used in an inclusive sense, to specify the presence of the stated item or feature but do not preclude the presence of additional items or features.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

The embodiments described above are provided by way of example only, and various other modifications will be apparent to persons skilled in the field without departing from the scope of the disclosure as defined by the appended claims.

The invention claimed is:

1. An actuator, comprising:
a controller comprising a housing;
a motor comprising a rotor, and the rotor comprises a rotating shaft; and
a sensor device;
wherein the motor is mounted on the outside of the housing, and the sensor device comprises a magnet and a sensor, the magnet is mounted on the rotating shaft of the motor, and the sensor is mounted inside the housing; wherein a groove is disposed on one side of the housing, one end of the rotating shaft is received in the groove, and the magnet is mounted on the end of the rotating shaft; wherein the sensor device further comprises a mounting member secured to the end of the rotating shaft, and the magnet is mounted in the mounting member, facing a bottom wall of the groove; wherein the mounting member comprises a latching portion for latching on the rotating shaft and a receiving portion for receiving the magnet, one end of the latching portion is provided with a clamping groove, and one end of the rotating shaft is retained in the clamping groove.

2. The actuator of claim 1, wherein a receiving cavity is formed in the housing, the sensor is disposed in the receiving cavity.

3. The actuator of claim 1, wherein a groove is disposed on one side of the housing, and the motor is partially recessed in the groove of the housing.

4. The actuator of claim 1, wherein a mounting groove is defined in a side of the bottom wall of the groove facing away from the rotating shaft, and the sensor is received in the mounting groove.

5. The actuator of claim 4, wherein the mounting groove, the groove, the magnet, and the rotating shaft are disposed opposite to each other in the axial direction of the rotating shaft.

6. The actuator of claim 1, wherein the housing comprises an upper cover and a lower cover, the upper cover and the lower cover are assembled to form a receiving cavity, the controller further comprises a circuit board received in the receiving cavity and a plurality of electronic components mounted on the circuit board, the motor is mounted on one side of the upper cover.

7. An electronic clutch system, comprising:
an actuator;
wherein the actuator comprises: a controller comprising a housing; a motor comprising a rotor, and the rotor comprises a rotating shaft; and a sensor device;
wherein the motor is mounted on the outside of the housing, and the sensor device comprises a magnet and a sensor, the magnet is mounted on the rotating shaft of the motor, and the sensor is mounted inside the housing; wherein a groove is disposed on one side of the housing, one end of the rotating shaft is received in the groove, and the magnet is mounted on the end of the rotating shaft; wherein the sensor device further comprises a mounting member secured to the end of the rotating shaft, and the magnet is mounted in the mounting member, facing a bottom wall of the groove; wherein the mounting member comprises a latching portion for latching on the rotating shaft and a receiving portion for receiving the magnet, one end of the latching portion is provided with a clamping groove, and one end of the rotating shaft is retained in the clamping groove.

8. The electronic clutch system of claim 7, wherein a receiving cavity is formed in the housing, the sensor is disposed in the receiving cavity.

9. The electronic clutch system of claim 7, wherein a groove is disposed on one side of the housing, and the motor is partially recessed in the groove of the housing.

10. The electronic clutch system of claim 7, wherein a mounting groove is defined in a side of the bottom wall of the groove facing away from the rotating shaft, and the sensor is received in the mounting groove.

11. The electronic clutch system of claim 10, wherein the mounting groove, the groove, the magnet, and the rotating shaft are disposed opposite to each other in the axial direction of the rotating shaft.

12. The electronic clutch system of claim 7, wherein the housing comprises an upper cover and a lower cover, the upper cover and the lower cover are assembled to form a receiving cavity, the controller further comprises a circuit board received in the receiving cavity and a plurality of electronic components mounted on the circuit board, the motor is mounted on one side of the upper cover.

* * * * *